(12) United States Patent
Nakamura (10) Patent No.: US 8,570,019 B2
(45) Date of Patent: Oct. 29, 2013

(54) SWITCHING POWER SOURCE APPARATUS

(75) Inventor: Masaru Nakamura, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 121 days.

(21) Appl. No.: 13/194,068

(22) Filed: Jul. 29, 2011

(65) Prior Publication Data

US 2012/0032661 A1  Feb. 9, 2012

(30) Foreign Application Priority Data

Aug. 5, 2010 (JP) ................................. 2010-176047

(51) Int. Cl.
*G05F 1/00* (2006.01)

(52) U.S. Cl.
USPC .......................................... 323/284; 323/288

(58) Field of Classification Search
USPC ......... 323/288, 222, 224, 282, 283, 284, 285, 323/287, 299, 301
See application file for complete search history.

(56) References Cited

U.S. PATENT DOCUMENTS

| | | | | |
|---|---|---|---|---|
| 6,356,063 B1 * | 3/2002 | Brooks | ......................... | 323/284 |
| 6,583,610 B2 | 6/2003 | Groom et al. | | |
| 7,492,615 B2 * | 2/2009 | Morota et al. | ............. | 363/21.16 |
| 7,595,624 B2 * | 9/2009 | Tateishi et al. | ................ | 323/288 |
| 8,193,798 B1 * | 6/2012 | Pace et al. | ...................... | 323/284 |
| 2006/0113976 A1 * | 6/2006 | Bernardon | ..................... | 323/282 |
| 2012/0032661 A1 * | 2/2012 | Nakamura | ..................... | 323/288 |

FOREIGN PATENT DOCUMENTS

JP  2008-72891  3/2008

OTHER PUBLICATIONS

U.S. Appl. No. 13/150,624, filed Jun. 1, 2011, Nakamura.
U.S. Appl. No. 13/184,663, filed Jul. 18, 2011, Nakamura.
U.S. Appl. No. 13/209,808, filed Aug. 15, 2011, Nakamura.

* cited by examiner

*Primary Examiner* — Timothy J Dole
*Assistant Examiner* — Ivan Laboy Andino
(74) *Attorney, Agent, or Firm* — Oblon, Spivak, McClelland, Maier & Neustadt, L.L.P.

(57) ABSTRACT

A switching power source apparatus includes a high-side MOSFET 11 connected to an input voltage, a ramp signal generator 18 to generate a ramp signal in synchronization with a switching frequency of the high-side MOSFET 11, an amplitude signal generator to generate an amplitude signal Comp corresponding to an amplitude of the ramp signal, a superposing circuit 3 to generate a second ramp signal having a positive inclination corresponding to the amplitude and frequency of the ramp signal and provide a superposed signal by superposing the second ramp signal on a first reference voltage, a controller 1 to control the ON timing and ON width of the high-side MOSFET 11, and a sudden heavy load detector 23 to detect if light load changes to heavy load, and if detects such a change, widen the ON width of the high-side MOSFET 11.

13 Claims, 11 Drawing Sheets

SWITCHING POWER SOURCE APPARATUS

BACKGROUND OF THE INVENTION

1. Field of the Invention

The present invention relates to a switching power source apparatus for supplying a stable DC voltage.

2. Description of Related Art

A DC-DC converter for supplying a source voltage to a digital signal processing LSI such as an image engine or a CPU is required to have an improved load response to minimize variation in an output voltage when the LSI dynamically changes its load. To meet the requirement, some DC-DC converter employs an error amplifier to compare an output voltage with a reference voltage. The error amplifier, however, causes a delay that may deteriorate the load response of the DC-DC converter. To avoid the delay caused by the error amplifier, a device that is widely used is a ripple converter employing no error amplifier, and instead, adopting PFM (pulse frequency modulation) control to improve load response with respect to the load of the digital device.

A PFM ripple converter according to a related art detects a ripple voltage in an output voltage, and to obtain a sufficient ripple signal, employs as an output capacitor an electrolytic capacitor having a large ESR (equivalent series resistance). The electrolytic capacitor, however, hinders compactness of the ripple converter.

To deal with this problem, U.S. Pat. No. 6,583,610 (Patent Document 1) and Japanese Unexamined Patent Application Publication No. 2008-72891 (Patent Document 2) disclose a technique of superposing a ramp signal assuming a ripple by ESR on a feedback voltage or reference voltage, to secure stable operation even when a ceramic capacitor having a small ESR is used as an output capacitor.

Figure 1:
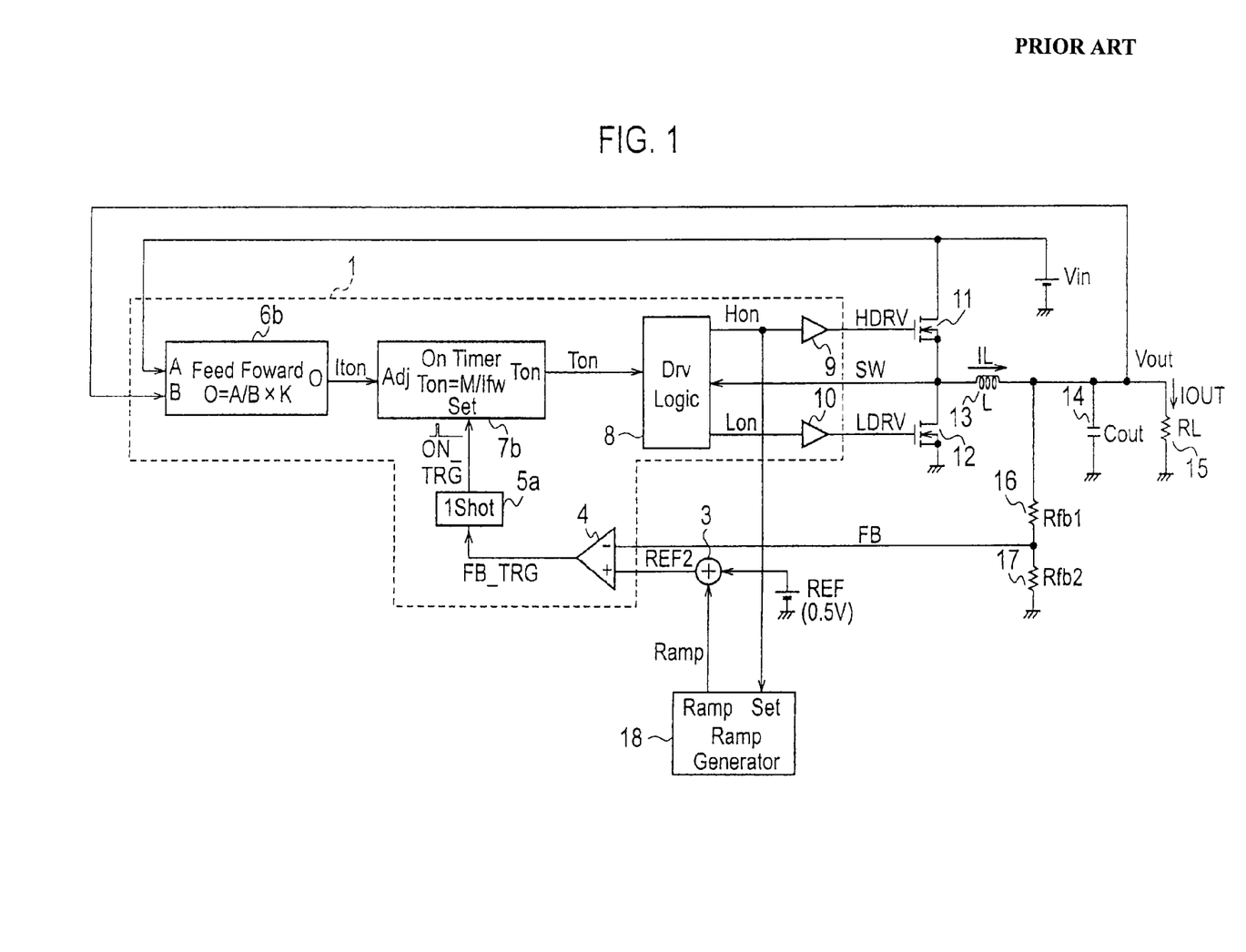
FIG. 1 is a circuit diagram illustrating a switching power source apparatus according to a related art.
Figure 2:
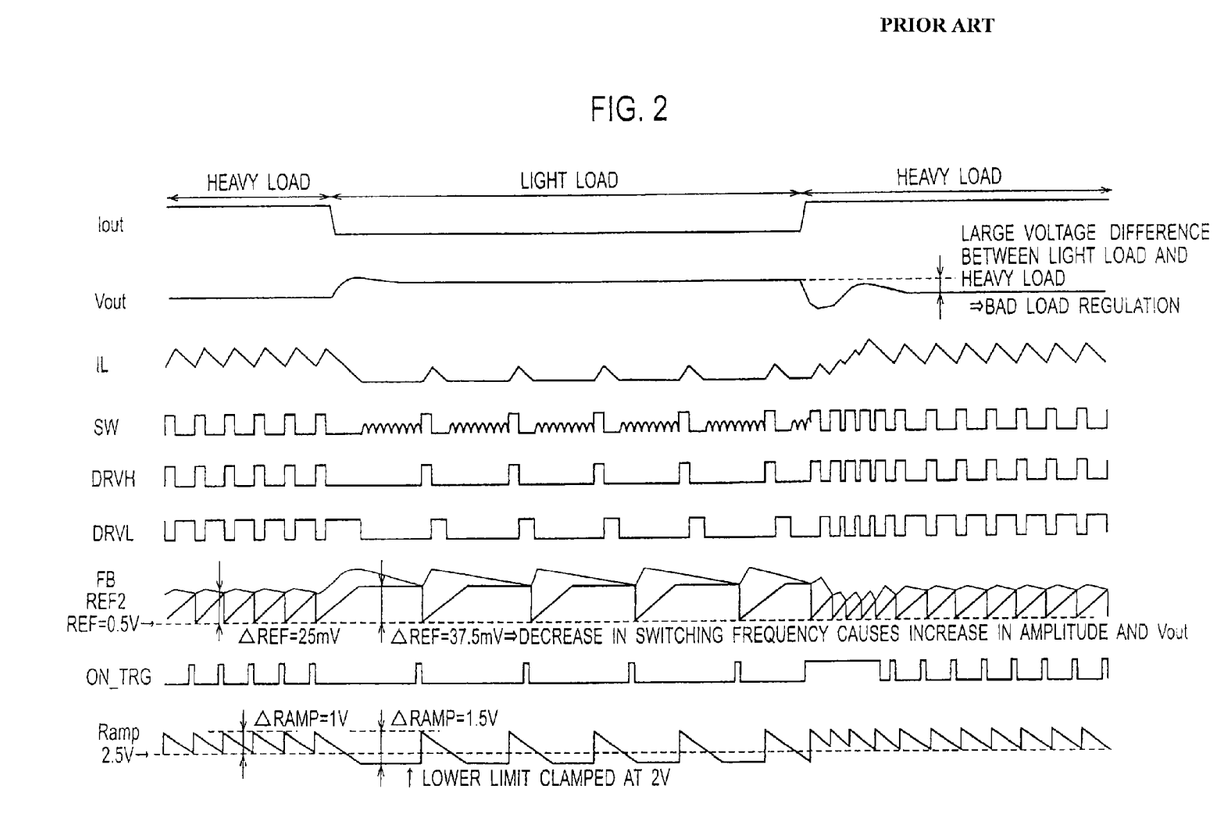
FIG. 2 is a timing chart illustrating operation of the switching power source apparatus of FIG. 1.

FIG. 1 is a circuit diagram illustrating a switching power source apparatus prepared according to the teachings of Patent Documents 1 and 2 and FIG. 2 is a timing chart illustrating operation of the apparatus of FIG. 1. With reference to FIGS. 1 and 2, operation of the switching power source apparatus employing the related-art ripple control technique with fixed ON width will be explained. The technique disclosed in Patent Documents 1 and 2 superposes a ramp signal on a feedback signal. This technique is operationally equivalent to a technique of superposing a ramp signal on a reference voltage, and therefore, the apparatus and operation of FIGS. 1 and 2 will be explained in connection with the technique of superposing a ramp signal on a reference voltage because it is convenient for explaining embodiments of the present invention.

In FIG. 1, a ramp generator 18 generates a ramp signal Ramp assuming a ripple signal by ESR and outputs the ramp signal Ramp to a superposing circuit 3. The superposing circuit 3 superposes the ramp signal Ramp on a first reference voltage REF, to generate a second reference voltage REF2 having a positive inclination and output the same to a non-inverting input terminal of a feedback comparator 4.

An inverting input terminal of the feedback comparator 4 receives a feedback voltage FB. The feedback voltage FB is produced by dividing an output voltage Vout by feedback voltage dividing resistors 16 and 17. If the feedback voltage FB is lower than the second reference voltage REF2, the feedback comparator 4 immediately outputs a signal FB_TRG to a one-shot circuit 5a.

In response to the signal FB_TRG, the one-shot circuit 5a outputs a signal $ON_{13}$ TRG having a predetermined time width to a terminal Set of an ON timer 7b.

A feedforward circuit 6b maintains a predetermined switching frequency even if an input voltage Vin and the output voltage Vout change. For this, the feedforward circuit 6b detects the input voltage Vin and output voltage Vout, generates a feedforward signal Iton that is proportional to the input voltage Vin and inversely proportional to the output voltage Vout, and outputs the same to a terminal Adj of the ON timer 7b.

The ON timer 7b uses as a trigger the signal ON TRG from the one-shot circuit 5a and outputs a signal Ton corresponding to the feedforward signal Iton to a drive logic circuit 8. The larger the feedforward signal Iton, the narrower the time width of the signal Ton.

Based on the signal Ton from the ON timer 7b, the drive logic 8 outputs a drive signal Hon for a high-side driver 9 and a drive signal Lon for a low-side driver 10. The drive logic 8 detects, from a signal SW, that a regenerative period ends and the polarity of a current IL passing through an inductor 13 inverts, and then, changes the drive signal Lon from high to low to turn off a low-side MOSFET 12, thereby preventing the inductor current IL from excessively passing in a reverse direction and avoiding a useless loss.

In response to the signal Hon from the drive logic 8, the high-side driver 9 drives a gate of a high-side MOSFET 11, to supply energy through the inductor 13 to an output capacitor 14 and output load 15.

In response to the signal Lon from the drive logic 8, the low-side driver 10 drives a gate of the low-side MOSFET 12, to turn on the low-side MOSFET 12 in a regenerative period of the inductor current IL after the high-side MOSFET 11 is turned off, thereby reducing a conduction loss.

In this way, the switching power source apparatus of FIG. 1 turns on the high-side MOSFET 11 as soon as the output voltage Vout decreases due to a sudden change from light load to heavy load in an output load current Iout, thereby improving load response. In addition, the apparatus of FIG. 1 enables a ceramic capacitor to be used as an output capacitor, which the related-art ripple control technique is unachievable.

SUMMARY OF THE INVENTION

The technique of superposing a ramp signal having a given inclination on the feedback voltage FB or reference voltage REF according to Patent Documents 1 and 2, however, has a problem. A change in the output load current Iout results in changing the switching frequency of the high-side MOSFET 11 and the amplitude of the ramp signal Ramp. This results in changing the output voltage Vout, to deteriorate a load regulation that is an important characteristic of the DC-DC converter. This will be explained in detail with reference to the timing chart of FIG. 2.

When the output load current Iout suddenly changes from heavy load to light load, the output voltage Vout momentarily jumps, and thereafter, decreases as time passes. When the feedback signal FB decreases below a peak of the second reference voltage REF2 on which the ramp signal Ramp is superposed, the one-shot circuit 5a outputs the ON trigger signal ON_TRG to turn on the high-side MOSFET 11. However, the smaller the output load current Iout, the longer the ON timing of the high-side MOSFET 11 delays. Namely, the lower the output load current Iout, the lower the switching frequency of the high-side MOSFET 11.

When the switching frequency of the high-side MOSFET 11 decreases, the amplitude of the ramp signal Ramp superposed on the first reference voltage REF increases, and therefore, the second reference voltage REF2 becomes larger than that under heavy load. This results in deteriorating the load regulation characteristic of the switching power source apparatus. As illustrated in FIG. 2, the output voltage Vout sharply drops when the light load changes to heavy load and does not recover thereafter. This means that there is a large voltage difference between light load and heavy load, to deteriorate the load regulation characteristic.

To improve the load regulation characteristic, the amplitude of the ramp signal Ramp superposed on the second reference voltage REF2 must be decreased. This, however, destabilizes operation because the output capacitor of the switching power source apparatus is a ceramic capacitor having a small ESR for compactness of the switching power source apparatus.

In consideration of the problems of the related arts, the present invention provides a switching power source apparatus capable of carrying out a stable operation even with an output capacitor having a small ESR and securing a good load regulation characteristic.

According to an aspect of the present invention, the switching power source apparatus includes a high-side switch connected to an input voltage, a ramp signal generator configured to generate a ramp signal in synchronization with a switching frequency of the high-side switch, an amplitude signal generator configured to generate an amplitude signal corresponding to an amplitude of the ramp signal, a superposing circuit configured to generate a second ramp signal having a positive inclination corresponding to the amplitude and frequency of the ramp signal and provide a superposed signal by superposing the second ramp signal on a first reference voltage, a controller configured to compare the superposed signal with a feedback signal corresponding to an output voltage, and if the feedback signal is lower than the superposed signal, control the ON timing of the high-side switch so that the high-side switch turns on, the controller being also configured to control the ON width of the high-side switch according to the amplitude signal, input voltage, and output voltage, and a sudden heavy load detector configured to detect if light load changes to heavy load according to the superposed signal and feedback signal, and if detects such a change, widen the ON width of the high-side switch.

DESCRIPTION OF PREFERRED EMBODIMENTS

Switching power source apparatuses according to embodiments of the present invention will be explained in detail with reference to the drawings.

Embodiment 1

A switching power source apparatus according to Embodiment 1 of the present invention will be explained with reference to FIG. 3. Parts of FIG. 3 that are similar to those of the related art of FIG. 1 are represented with like reference numerals to avoid a repetition of explanation.

Figure 3:
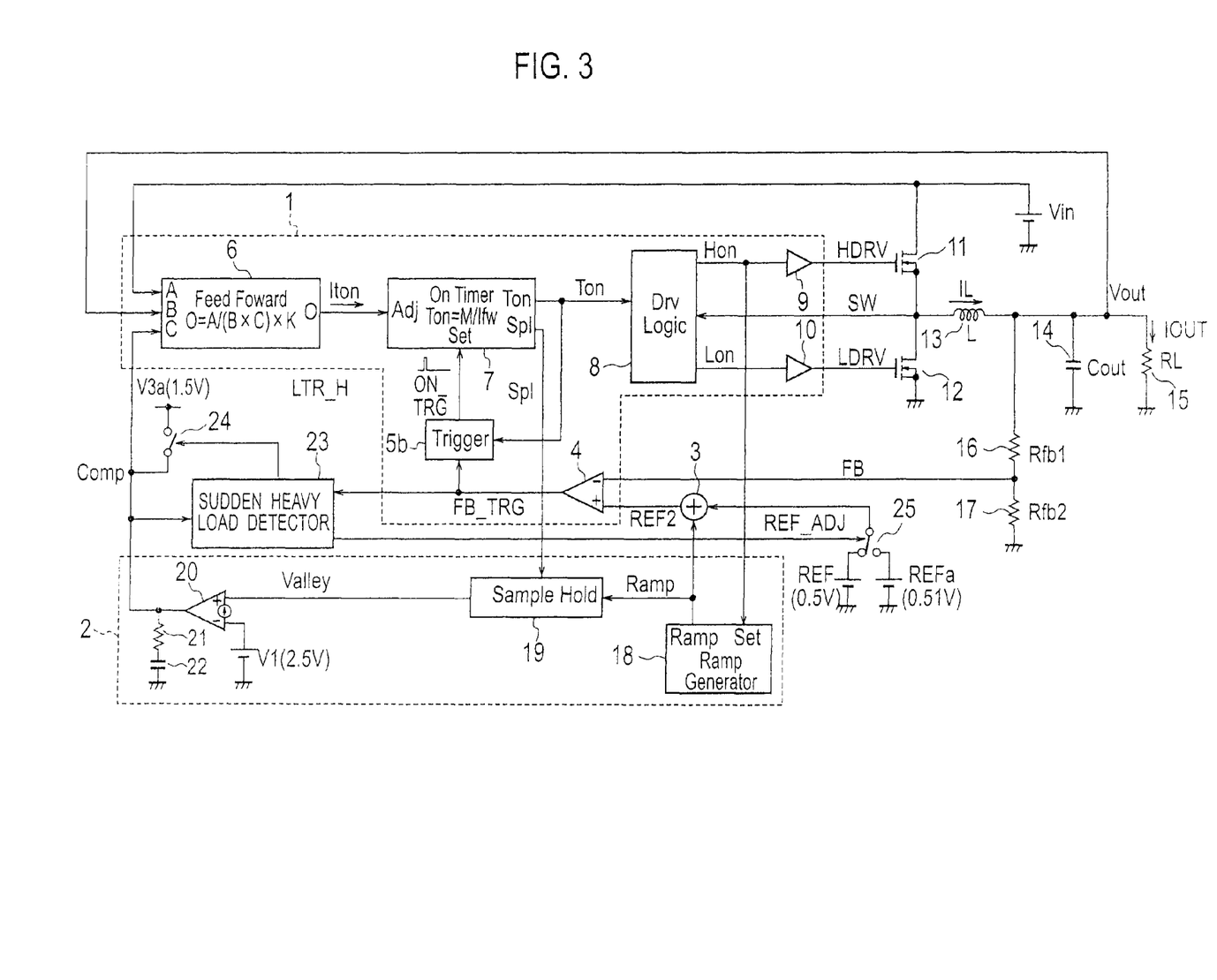
FIG. 3 is a circuit diagram illustrating a switching power source apparatus according to Embodiment 1 of the present invention.

In FIG. 3, the switching power source apparatus according to the present embodiment includes a first feedback controller 1, a second feedback controller 2, a superposing circuit 3, a high-side MOSFET 11, a low-side MOSFET 12, an inductor 13, an output smoothing capacitor 14, an output load 15, feedback resistors 16 and 17, a sudden heavy load detector 23, and a switch 24.

The first feedback controller 1 includes a feedback comparator 4, a trigger circuit 5b, a feedforward circuit 6, an ON timer 7, a drive logic circuit 8, a high-side driver 9, and a low-side driver 10.

The second feedback controller 2 includes a ramp generator 18, a sample and hold circuit 19, an error amplifier 20, a phase compensation resistor 21, and a phase compensation capacitor 22.

The switching power source apparatus of the present embodiment principally differs from the switching power source apparatus of the related art illustrated in FIG. 1 in that the apparatus of Embodiment 1 additionally has the second feedback controller 2, sudden heavy load detector 23, and switch 24.

The high-side MOSFET 11 corresponds to the high-side switch as stipulated in the claims. A drain of the high-side MOSFET 11 is connected to the input voltage Vin and a source thereof is connected to a drain of the low-side MOSFET 12 and through the inductor 13 to the output load 15. The switching power source apparatus according to the present embodiment carries out switching operation of the high- and low-side MOSFETs 11 and 12, to convert the input voltage Vin into a predetermined output voltage Vout supplied to the output load 15.

The first feedback controller 1 acts as a major loop to handle the output load 15 that dynamically changes. If the output load 15 suddenly changes from light load to heavy load, the first feedback controller 1 operates at once without using the error amplifier 20, to minimize a change in the output voltage Vout.

On the other hand, the second feedback controller 2 acts as a minor loop to detect an amplitude of a ramp signal Ramp generated by the ramp generator 18 and optimize an ON width of the high-side MOSFET 11 in such a way as to keep constant the amplitude of the ramp signal Ramp without regard to an output load current Iout. This results in keeping constant a switching frequency Fsw of the high-side MOS- FET 11. With this control, the peak of a second reference voltage REF2 is always kept constant with respect to a static load variation, thereby remarkably improving the load regulation characteristic of the switching power source apparatus without sacrificing control stability. Consequently, the present embodiment solves the load regulation deteriorating problem of the related art.

Figure 4:
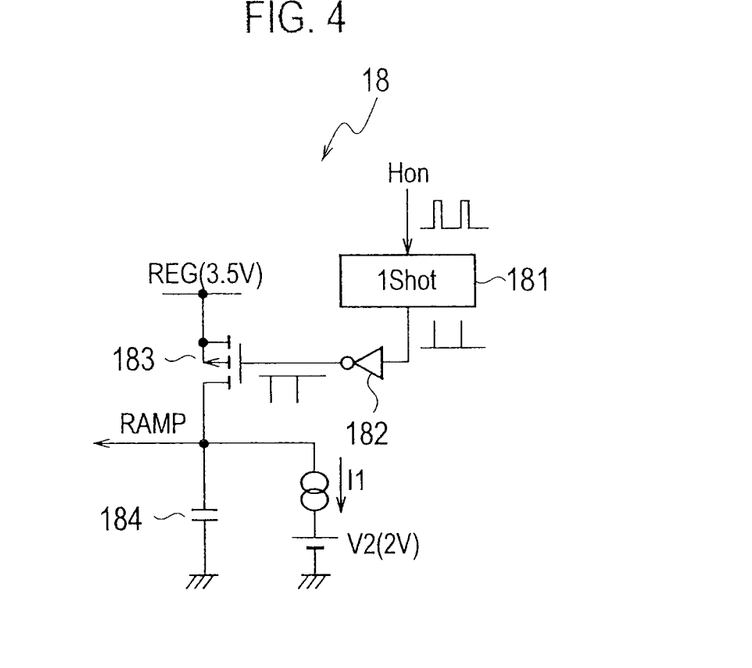
FIG. 4 is a circuit diagram illustrating a ramp generator arranged in the switching power source apparatus of FIG. 3.

The ramp generator 18 corresponds to the ramp signal generator as stipulated in the claims and generates the ramp signal Ramp in synchronization with the switching frequency of the high-side MOSFET 11. FIG. 4 is a circuit diagram illustrating the details of the ramp generator 18. In FIG. 4, the ramp generator 18 includes a one-shot circuit 181, an inverter 182, a p-channel MOSFET 183, a capacitor 184, a constant current source I1, and a lower limit clamping voltage V2.

The one-shot circuit 181 receives a drive signal Hon from the high-side driver 9, and when the drive signal Hon changes to high, turns on the p-channel MOSFET 183 for a very short period such as about 100 ns, thereby charging the capacitor 184 to a power source voltage REG at once.

When the p-channel MOSFET 183 is turned off, the capacitor 184 is gradually discharged by the constant current source I1. As a result, the ramp generator 18 generates the ramp signal Ramp assuming a ripple signal by ESR and outputs the ramp signal Ramp to the superposing circuit 3 and sample & hold circuit 19.

The superposing circuit 3 generates a second ramp signal having a positive inclination and corresponding to the amplitude and frequency of the ramp signal Ramp generated by the ramp generator 18 and superposes the second ramp signal on a first reference voltage REF (0.5 V), to generate a superposed signal REF2. The first reference voltage is switched between REF (0.5 V) and REFa (0.51 V) depending on operation of a switch 25. Here, it is supposed that REF (0.5 V) is selected.

Figure 5:
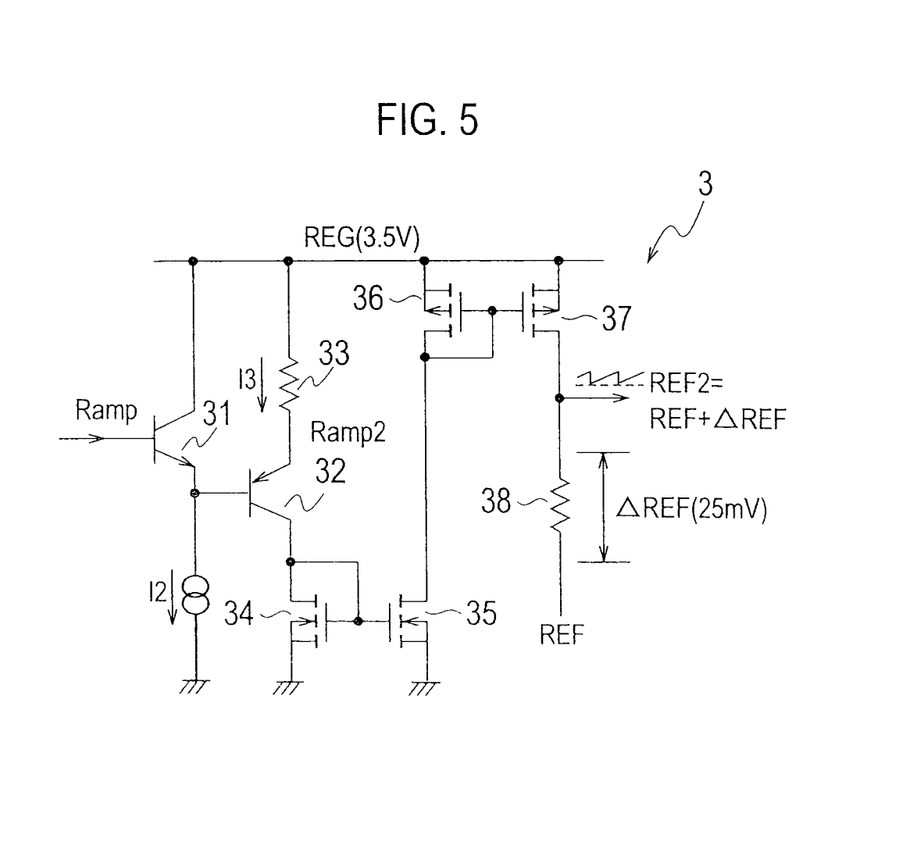
FIG. 5 is a circuit diagram illustrating a superposing circuit arranged in the switching power source apparatus of FIG. 3.

FIG. 5 is a circuit diagram illustrating the details of the superposing circuit 3. In FIG. 5, the superposing circuit 3 includes an npn transistor 31, a pnp transistor 32, a resistor 33, n-channel MOSFETs 34 and 35, p-channel MOSFETs 36 and 37, a resistor 38, and a constant current source 12.

The ramp signal Ramp generated by the ramp generator 18 is received by a buffer circuit of the npn transistor 31 and pnp transistor 32. The buffer circuit carries out impedance conversion on the ramp signal Ramp, so that an emitter of the pnp transistor 32 outputs the second ramp signal Ramp2 whose voltage level is substantially equal to that of the ramp signal Ramp. As a result, both ends of the resistor 33 cause a potential difference of (REG–Ramp2) to generate a current signal I3 corresponding to a change in the ramp signal Ramp. The current signal I3 passes through a current mirror circuit of the n-channel MOSFETs 34 and 35 and a current mirror circuit of the p-channel MOSFETs 36 and 37 and is converted into a voltage by the resistor 38.

In this way, at a high-potential terminal of the resistor 38, the superposing circuit 3 superposes the second ramp signal Ramp2 having a positive inclination corresponding to the ramp signal Ramp on the first reference voltage REF that is a stable DC voltage, to generate the second reference voltage REF2 (corresponding to the superposed signal stipulated in the claims) and output the same to a non-inverting input terminal of the feedback comparator 4.

The sample and hold circuit 19, error amplifier 20, phase compensation resistor 21, and phase compensation capacitor 22 arranged in the second feedback controller 2 correspond to the amplitude signal generator as stipulated in the claims and generate an amplitude signal Comp corresponding to an amplitude of the ramp signal Ramp generated by the ramp generator 18.

Figure 6:
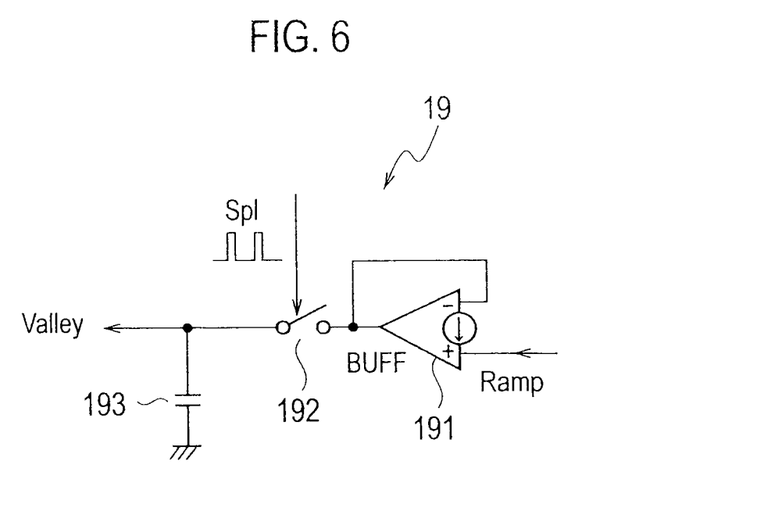
FIG. 6 is a circuit diagram illustrating a sample and hold circuit arranged in the switching power source apparatus of FIG. 3.

The sample and hold circuit 19 holds a valley voltage of the ramp signal Ramp generated by the ramp generator 18. FIG. 6 is a circuit diagram illustrating the details of the sample & hold circuit 19. In FIG. 6, the sample and hold circuit 19 includes a buffer circuit 191, a switch 192, and a capacitor 193.

The buffer circuit 191 outputs an impedance-converted signal of the ramp signal Ramp. When the ramp signal Ramp reaches a valley voltage Valley, the switch 192 turns on for a predetermined sampling period in response to a sampling signal Sp1 from the ON timer 7, to charge the capacitor 193. Accordingly, the capacitor 193 holds the valley voltage Valley of the ramp signal Ramp until the next sampling period.

The error amplifier 20 corresponds to the error amplifier as stipulated in the claims. The error amplifier 20 compares the valley voltage Valley held by the sample and hold circuit 19 with a reference voltage V1, generates an error amplified signal according to a result of the comparison, and outputs the error amplified signal as the amplitude signal Comp. Namely, the error amplifier 20 compares the valley voltage Valley with the reference voltage V1 and outputs the amplitude signal Comp, which is phase-compensated by the resistor 21 and capacitor 22 and is sent to the feedforward circuit 6.

The first feedback controller 1 corresponds to the controller as stipulated in the claims. The first feedback controller 1 compares the superposed signal. REF2 generated by the superposing circuit 3 with a feedback signal FB representative of the output voltage Vout, and if the feedback signal FB is lower than the superposed signal REF2, controls the ON timing of the high-side switch, i.e., the high-side MOSFET 11 so as to turn on the high-side switch. At the same time, the first feedback controller 1 controls an ON width of the high-side switch according to the amplitude signal Comp generated by the amplitude signal generator, the input voltage Vin, and the output voltage Vout.

Figure 7:
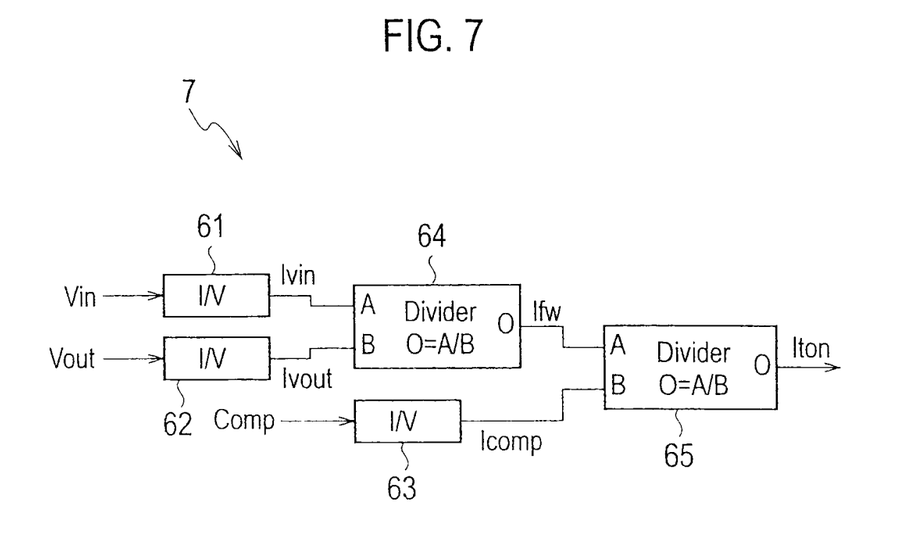
FIG. 7 is a circuit diagram illustrating a feedforward circuit arranged in the switching power source apparatus of FIG. 3.

FIG. 7 is a circuit diagram illustrating the details of the feedforward circuit 6. In FIG. 7, the feedforward circuit 6 includes voltage-current converters 61, 62, and 63 and dividers 64 and 65.

The voltage-current converter 61 converts the input voltage Vin into a current signal Ivin. The voltage-current converter 62 converts the output voltage Vout into a current signal Ivout. The voltage current converter 63 converts the amplitude signal (error amplified voltage) Comp into a current signal Icomp.

The divider 64 divides the current signal Ivin by the current signal Ivout and outputs a current signal Ifw to the divider 65.

The divider 65 divides the current signal Ifw by the current signal Icomp and outputs a current signal Iton according to a relationship of "Iton=K×Vin/(Vout×Comp)". Here, "K" is a conversion coefficient for converting the input voltage Vin, output voltage Vout, and amplitude signal Comp into the current signal. The conversion coefficient K has a dimension inversely proportional to a resistance value.

The feedforward circuit 6 outputs the output current Iton to a terminal Adj of the ON timer 7, the output current Iton being proportional to the input voltage Vin and inversely proportional to the output voltage Vout. With this operation of the feedforward circuit 6, the first feedback controller 1 controls the ON width of the high-side MOSFET 11 in such a way as to maintain the switching frequency of the high-side MOSFET 11 without regard to the input and output conditions. The output current Iton is inversely proportional to the amplitude signal (error amplified signal) Comp from the second feedback controller 2, and therefore, the first feedback controller 1 also controls the ON width of the high-side MOSFET 11 in such a way as to equalize the valley voltage Valley of the ramp signal Ramp with the reference voltage V1.

The first feedback controller 1 with the feedforward circuit 6 uses the amplitude signal Comp from the amplitude signal generator, to control the ON width of the high-side MOSFET 11, i.e., the high-side switch so that the amplitude of the ramp signal Ramp generated by the ramp generator 18 keeps a predetermined value.

The feedback comparator 4 compares the feedback voltage FB with the second reference voltage REF2, and if the feedback voltage FB is lower than a peak of the second reference voltage REF2, outputs a signal FB_TRG to the trigger circuit 5b.

Figure 8:
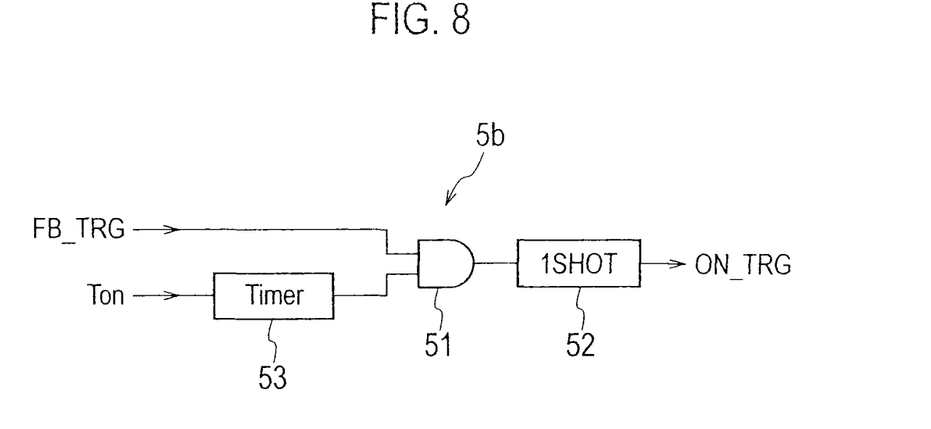
FIG. 8 is a circuit diagram illustrating a trigger circuit arranged in the switching power source apparatus of FIG. 3.

Based on the signal FB_TRG, the trigger circuit 5b generates a signal ON-TRG and outputs the same to a terminal Set of the ON timer 7. FIG. 8 is a circuit diagram illustrating the details of the trigger circuit 5b. In FIG. 8, the trigger circuit 5b includes an AND gate 51, a one-shot circuit 52, and a timer 53. When receiving the signal FB_TRG, the one-shot circuit 52 is set to output the signal ON-TRG having a predetermined width to the ON timer 7.

If the signal FB-TRG keeps high level, the ON timer 7 outputs a high-level drive logic control signal Ton. When the signal Ton changes to low, the timer 53 outputs a low-level signal to the AND gate 51, to once reset the one-shot circuit 52.

Figure 9:
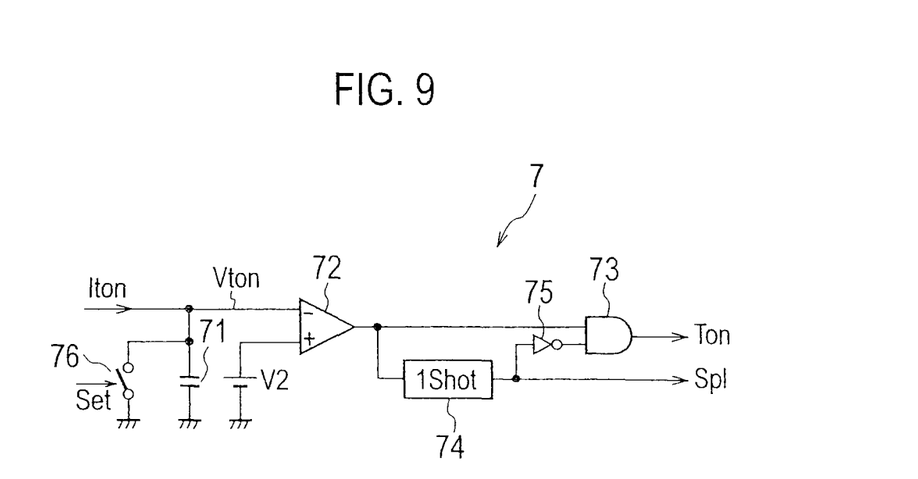
FIG. 9 is a circuit diagram illustrating an ON timer arranged in the switching power source apparatus of FIG. 3.

FIG. 9 is a circuit diagram illustrating the details of the ON timer 7. In FIG. 9, the ON timer 7 includes a capacitor 71, a comparator 72, an AND gate 73, a one-shot circuit 74, an inverter 75, and a switch 76.

In response to the signal ON_TRG from the trigger circuit 5b, the switch 76 turns on for the predetermined time. When the switch 76 turns on, the capacitor 71 discharges at once. As a result, the comparator 72 provides a logical output level of high and the one-shot circuit 74 outputs a sampling signal Sp1 having a predetermined period.

When the sampling period set by the one-shot circuit 74 ends, the AND gate 73 makes an output signal, i.e., the drive logic control signal Ton high. Thereafter, the capacitor 71 is charged according to the feedforward current signal Iton. When the capacitor 71 reaches a threshold voltage V2, the comparator 72 provides a low-level output so that the AND gate 73 changes the drive logic control signal Ton to low.

Based on the drive logic control signal Ton from the ON timer 7, the drive logic 8 outputs the drive signal Hon for the high-side driver 9 and the drive signal Lon for the low-side driver 10, the drive signals Hon and Lon being in reverse phase. According to a voltage SW, the drive logic 8 detects that a regenerative period of the inductor 13 ends and the polarity of the current IL passing through the inductor 13 inverts, and then, changes the low-side drive signal Lon from high to low to turn off the low-side MOSFET 12. This prevents an excessive reverse flow of the inductor current IL and a useless loss.

According to the signal Hon from the drive logic 8, the high-side driver 9 drives the gate of the high-side MOSFET 11 to supply energy through the inductor 13 to the output capacitor 14 and output load 15.

According to the signal Lon from the drive logic 8, the low-side driver 10 drives the gate of the low-side MOSFET 12, to turn on the low-side MOSFET 12 in a regenerative period of the inductor current IL after the high-side MOSFET 11 is turned off, thereby reducing a conduction loss.

The sudden heavy load detector 23 corresponds to the sudden heavy load detector as stipulated in the claims. Based on the superposed signal REF2 generated by the superposing circuit 3 and the feedback signal FB, the sudden heavy load detector 23 detects if light load has changed to heavy load, and if detects such a change, widens the ON width of the high-side MOSFET 11.

Figure 10:
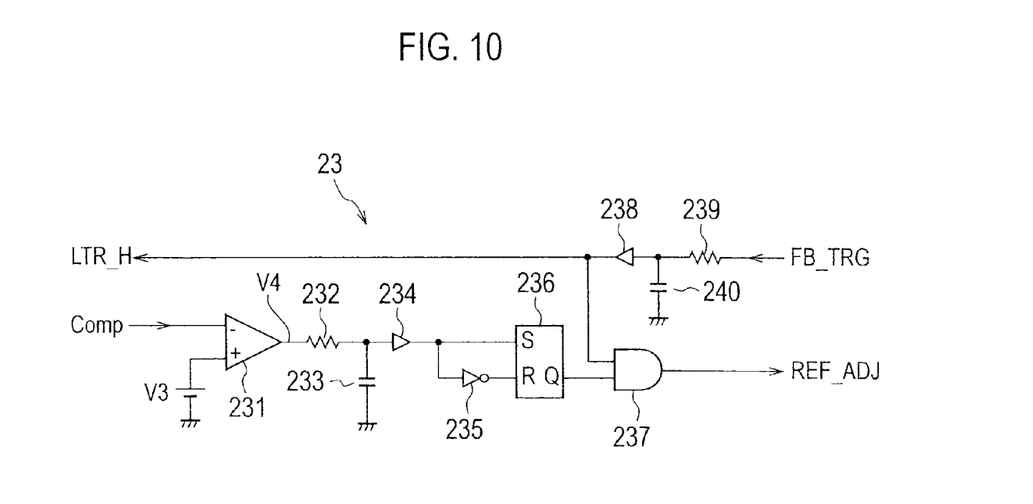
FIG. 10 is a circuit diagram illustrating a sudden heavy load detector arranged in the switching power source apparatus of FIG. 3.

FIG. 10 is a circuit diagram illustrating the details of the sudden heavy load detector 23 arranged in the switching power source apparatus of the present embodiment. In FIG. 10, the sudden heavy load detector 23 includes a comparator 231, a delay circuit including a resistor 232 and a capacitor 233, a buffer 234, an inverter 235, an SR flip-flop 236, an AND gate 237, a delay circuit including a resistor 239 and a capacitor 240, and a buffer 238.

If the output load current Iout indicates light load and if the amplitude signal (error amplified signal) Comp is lower than a threshold value V3, the comparator 231 provides a high-level output to set the SR flip-flop 236, which outputs a high-level output signal to the AND gate 237.

If the output load current Iout suddenly changes from the light load to heavy load and if the feedback voltage FB is lower than the reference voltage REF2, the signal FB-TRG from the feedback comparator 4 keeps high level. If the high-level continues more than a delay time created by the resistor 239 and capacitor 240, the buffer 238 outputs a signal LTR_H of high level.

The signal LTR_H of high level turns on the switch 24 to forcibly increase the amplitude signal (error amplified signal) Comp. Namely, if the sudden heavy load detector 23 detects that light load has changed to heavy load, it forcibly changes the amplitude signal Comp to widen the ON width of the high-side MOSFET 11.

When the buffer 238 outputs the signal LTR_H of high level, the AND gate 237 outputs a signal REF_ADJ of high level to change the switch 25 to the second reference voltage REFa that is 1% to 2% higher than the reference voltage REF. The switch 25 is designed to select REFa of 0.51 V if receiving a high-level signal and REF of 0.5 V if receiving a low-level signal.

Figure 11:
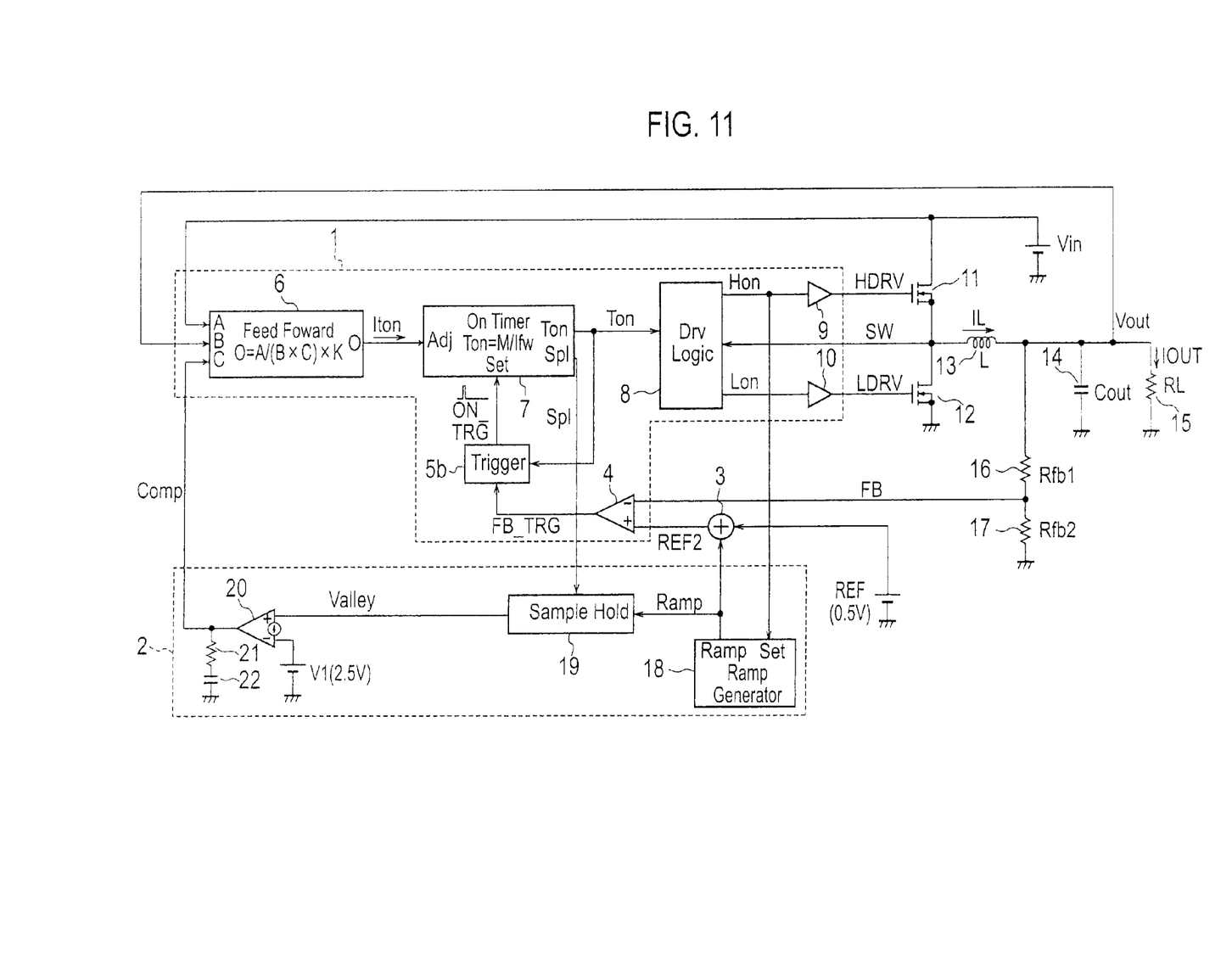
FIG. 11 is a circuit diagram illustrating the switching power source apparatus of Embodiment 1 based on an assumption that if it has no sudden heavy load detector.

The sudden heavy load detector 23 and switch 25 correspond to the reference voltage controller as stipulated in the claims. Based on a detection result of the sudden heavy load detector 23 and the amplitude signal Comp generated by the amplitude signal generator, the reference voltage controller controls the magnitude of the first reference voltage. At the time of sudden heavy load, the reference voltage controller increases a target voltage for the feedback control and temporarily improves load response. Operation of the present embodiment with the above-mentioned configuration will be explained. First, operation of the second feedback controller 2 will be explained. For the sake of simplicity, the explanation will be made on an assumption that the sudden heavy load detector 23 is not provided. FIG. 11 is a circuit diagram illustrating the switching power source apparatus of the present embodiment based on an assumption that if it has no sudden heavy load detector 23 and related switches 24 and 25. A mechanism of greatly improving the load regulation characteristic of the switching power source apparatus of FIG. 11 by way of controlling the amplitude of a ramp signal to a constant value will be explained.

Figure 12:
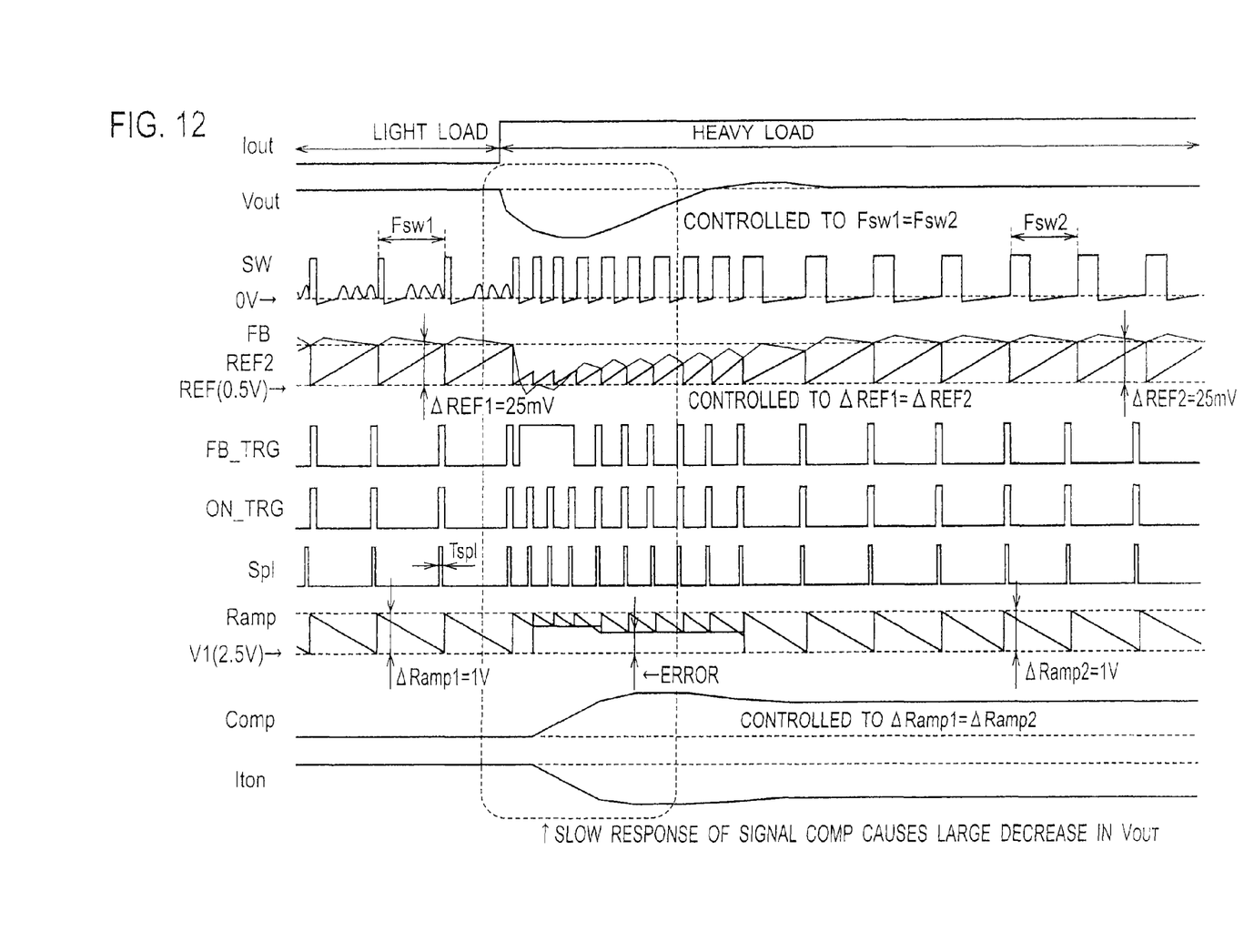
FIG. 12 is a timing chart illustrating operation of the switching power source apparatus of FIG. 11.

FIG. 12 is a timing chart illustrating operation of the switching power source apparatus of FIG. 11 without the sudden heavy load detector 23. When the output load current Iout passing through the output load 15 is in a steady light load state, the sample and hold circuit 19, error amplifier 20, and feedforward circuit 6 operate to equalize the valley voltage Valley of the ramp signal Ramp with the reference voltage V1.

When the output load current Iout suddenly changes to a heavy load state, the output voltage Vout applied to the output load 15 decreases to decrease the feedback voltage FB. When the feedback voltage FB becomes equal to or lower than the second reference voltage REF2, the trigger circuit 5b outputs the signal ON_TRG according to a comparison result from the feedback comparator 4. In response to the signal ON_TRG, the high-side MOSFET 11 is turned on at once. At this time, the valley voltage Valley of the ramp signal Ramp increases to produce an error with respect to the reference voltage V1.

To cancel the error, the error amplifier 20 in the second feedback controller 2 increases the amplitude signal Comp. In inversely proportional to the increase in the amplitude signal Comp, the feedforward current Iton from the feedforward circuit 6 decreases. Due to the decrease in the feedforward signal Iton, the ON timer 7 widens the width of the signal Ton.

As a result, the first feedback controller 1 widens the ON width of the high-side MOSFET 11. Namely, based on the amplitude signal Comp from the amplitude signal generator, the first feedback controller 1 widens the ON width of the high-side switch, i.e., the high-side MOSFET 11 if the amplitude of the ramp signal Ramp generated by the ramp generator 18 is lower than a predetermined value.

When the ON width of the high-side MOSFET 11 is widened, the switching frequency thereof decreases to maintain the ON duty thereof that is substantially determined by a ratio of the input voltage Vin to the output voltage Vout. Consequently, a switching frequency Fsw1 under light load and a switching frequency Fsw2 under heavy load of the high-side MOSFET 11 are equalized to each other. This results in equalizing the valley voltage Valley of the ramp signal Ramp with the reference voltage V1, and therefore, the amplitude of ΔREF superposed on the second reference voltage REF2 is controlled to be constant (ΔREF1=ΔREF2 as depicted in FIG. 12) without regard to the load current Iout.

On the other hand, if the feedback voltage FB increases and the valley voltage Valley of the ramp signal Ramp decreases to create an error between the valley voltage Valley and the reference voltage V1, the error amplifier 20 in the second feedback controller 2 decreases the amplitude signal Comp to cancel the error. As a result, the first feedback controller 1 narrows the ON width of the high-side MOSFET 11. Namely, according to the amplitude signal Comp from the amplitude signal generator, the first feedback controller 1 narrows the ON width of the high-side switch, i.e., the high-side MOSFET 11 if the amplitude of the ramp signal Ramp from the ramp generator 18 is equal to or greater than a predetermined value.

When the ON width of the high-side MOSFET 11 is narrowed, the switching frequency thereof increases to equalize the switching frequency Fsw1 under light load with the switching frequency Fsw2 under heavy load of the high-side MOSFET 11. This results in equalizing the valley voltage Valley of the ramp signal Ramp with the reference voltage V1, and therefore, the amplitude of ΔREF superposed on the second reference voltage REF2 is controlled to be constant without regard to the load current Iout.

A high-speed load responding operation when the output load current Iout suddenly changes from light load to heavy load will be explained in detail with reference to the timing chart of FIG. 12. When the output load current Iout is light load, a decrease in the switching frequency of the high-side MOSFET 11 is prevented by equalizing the valley voltage Valley of the ramp signal Ramp with the reference voltage V1, so that the amplitude signal (error amplified signal) Comp may decrease to narrow the ON width of the high-side MOSFET 11.

When the output load current Iout suddenly changes to heavy load, the output voltage Vout applied to the output load 15 decreases to decrease the feedback voltage FB. When the feedback voltage FB becomes equal to or lower than the second reference voltage REF2, the trigger circuit 5b outputs the signal ON_TRG to the ON timer 7, thereby instantly turning on the high-side MOSFET 11 by bypassing the error amplifier 20.

Thereafter, the output voltage Vout and feedback voltage FB start to increase. Irrespective of this, the signal FB_TRG keeps high level if the feedback voltage FB is lower than the reference voltage REF2.

When the signal FB_TRG is continuously high and when the drive logic control signal Ton changes from high to low to turn off the high-side MOSFET 11, the timer 53 in the trigger circuit 5b once resets the one-shot circuit 52 and immediately output the signal ON_TRG for the next cycle. Accordingly, the switching power source apparatus of the present embodiment can remarkably shorten the ON width of the low-side MOSFET 12 to about 100 ns, thereby expanding the ON duty of the high-side MOSFET 11 and improving load response.

In this way, for a dynamic load variation, the first feedback controller 1, i.e., a major loop quickly responds without using the error amplifier 20, to minimize a change in the output voltage Vout. On the other hand, for a static load variation, the error amplifier 20 is used to keep the amplitude of the ramp signal Ramp at a constant value. As a result, the switching power source apparatus of FIG. 11 greatly improves the load regulation characteristic thereof without sacrificing control stability, thereby solving the load regulation problem of the related art.

The switching power source apparatus of FIG. 11, however, is not provided with the sudden heavy load detector 23 and the related elements, and therefore, has some disadvantages. For example, when the output load current Iout suddenly changes from light load to heavy load, the apparatus of FIG. 11 immediately turns on the high-side MOSFET 11. At this time, the ON width of the high-side MOSFET 11 is determined by the amplitude signal (error amplified signal) Comp of the error amplifier 20 that has been phase-compensated with the resistor 21 and capacitor 22. This causes a control delay, and therefore, the ON width of the high-side MOSFET 11 is not speedily widened. As a result, the ON duty of the high-side MOSFET 11 does not expand as expected. As illustrated in the timing chart of FIG. 12, the switching power source apparatus of FIG. 11 without the sudden heavy load detector 23 has a drawback to cause a large drop in the output voltage Vout when the output load 15 suddenly changes from light load to heavy load.

Figure 13:
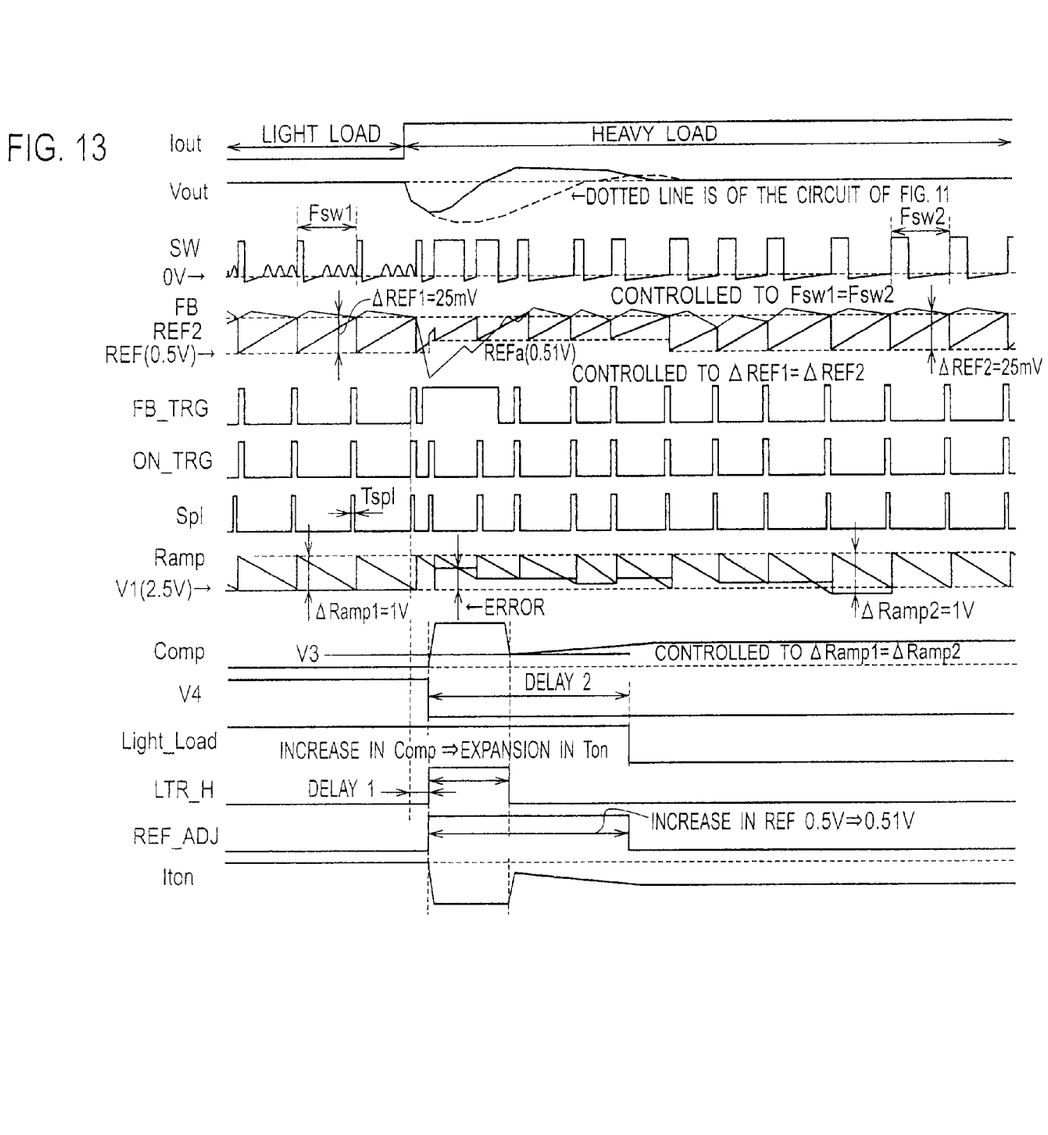
FIG. 13 is a timing chart illustrating operation of the switching power source apparatus of FIG. 3.

FIG. 13 is a timing chart illustrating operation of the switching power source apparatus of FIG. 3 having the sudden heavy load detector 23 according to the present embodiment. Unlike the operation illustrated in FIG. 12, the operation illustrated in FIG. 13 is with the sudden heavy load detector 23.

With reference to FIG. 13, a high-speed load responding operation of the apparatus of Embodiment 1 illustrated in FIG. 3 when the output load current Iout suddenly changes from light load to heavy load will be explained in detail. When the output load current Iout is light load, the valley voltage Valley of the ramp signal Ramp is equalized with the reference voltage V1, to prevent the switching frequency of the high-side MOSFET 11 from decreasing. This results in decreasing the amplitude signal (error amplified signal) Comp and narrowing the ON width of the high-side MOSFET 11. If the amplitude signal Comp becomes lower than the threshold value V3, the comparator 231 of the sudden heavy load detector 23 provides a high-level output to set the SR flip-flop 236, which outputs a high-level output signal to the AND gate 237.

If the output load current Iout suddenly changes from the light load to heavy load and if the feedback voltage FB decreases below the reference voltage REF2, the trigger circuit 5b outputs the signal ON_TRG to the ON timer 7, to immediately turn on the high-side MOSFET 11 by bypassing the error amplifier 20.

Thereafter, the output voltage Vout and feedback voltage FB start to increase. Irrespective of this, the signal FB_TRG keeps high level if the feedback voltage FB is lower than the reference voltage REF2.

When the signal FB_TRG is continuously high and when the drive logic control signal Ton changes from high to low to turn off the high-side MOSFET 11, the timer 53 in the trigger circuit 5b once resets the one-shot circuit 52 and immediately output the signal ON_TRG for the next cycle. Accordingly, the switching power source apparatus of the present embodiment can remarkably shorten the ON width of the low-side MOSFET 12 to about 100 ns, thereby expanding the ON duty of the high-side MOSFET 11 and improving load response.

If the signal FB_TRG continues high level longer than a delay time determined by the resistor 239 and capacitor 240, the sudden heavy load detector 23 changes the sudden heavy load signal LTR_H from low to high to turn on the switch 24, thereby forcibly increasing the amplitude signal (error amplified signal) Comp.

As a result, the current output Iton from the feedforward circuit 6 decreases to extremely expand the ON time of the high-side MOSFET 11 created by the ON timer 7. At the same time, the AND gate 237 generates a signal REF ADJ of high level according to the signal LTR_H of high level. In response to the signal REF_ADJ of high level, the switch 25 is temporarily changed to select the second reference voltage REFa that is 1% to 2% higher than the reference voltage REF. The time for which the second reference voltage REFa is temporarily selected is determined by a delay time that is determined by the resistor 232 and capacitor 233.

In this way, if the output load current Iout suddenly changes from light load to heavy load, the switching power source apparatus according to the present embodiment forcibly expands the ON width and ON duty of the high-side MOSFET 11 irrespective of the amplitude signal (error amplified signal) Comp. Accordingly, the apparatus of the present embodiment improves load response higher than the related art and is capable of further improving the load response by increasing the reference voltage (REF to REFa) by about 1% to 2% to temporarily increase a target voltage of the feedback control.

The switching power source apparatus according to the present embodiment stably operates even with an output capacitor having a small ESR and realizes a good load regulation characteristic.

Namely, the switching power source apparatus of the present embodiment operates to narrow the ON width of the high-side MOSFET 11 as the output load current Iout decreases, and therefore, the switching frequency of the high-side MOSFET 11 is mostly not dependent on the output load current Iout. This results in greatly improving the load regulation characteristic of the apparatus.

The switching power source apparatus of Embodiment 1 controls the output voltage Vout so that it keeps nearly a constant value irrespective of the magnitude of the output load current Iout. This greatly improves the load regulation characteristic of the apparatus compared with the related art.

When the output load current Iout suddenly changes from light load to heavy load, the switching power source apparatus of Embodiment 1 forcibly widens the ON width and ON duty of the high-side MOSFET 11 without regard to the amplitude signal (error amplified signal) Comp, to improve load response. The apparatus of Embodiment 1 also increases the reference voltage (from REF to REFa) by about 1% to 2% to temporarily increase a target voltage for the feedback control, thereby further improving the load response.

Embodiment 2

Figure 14:
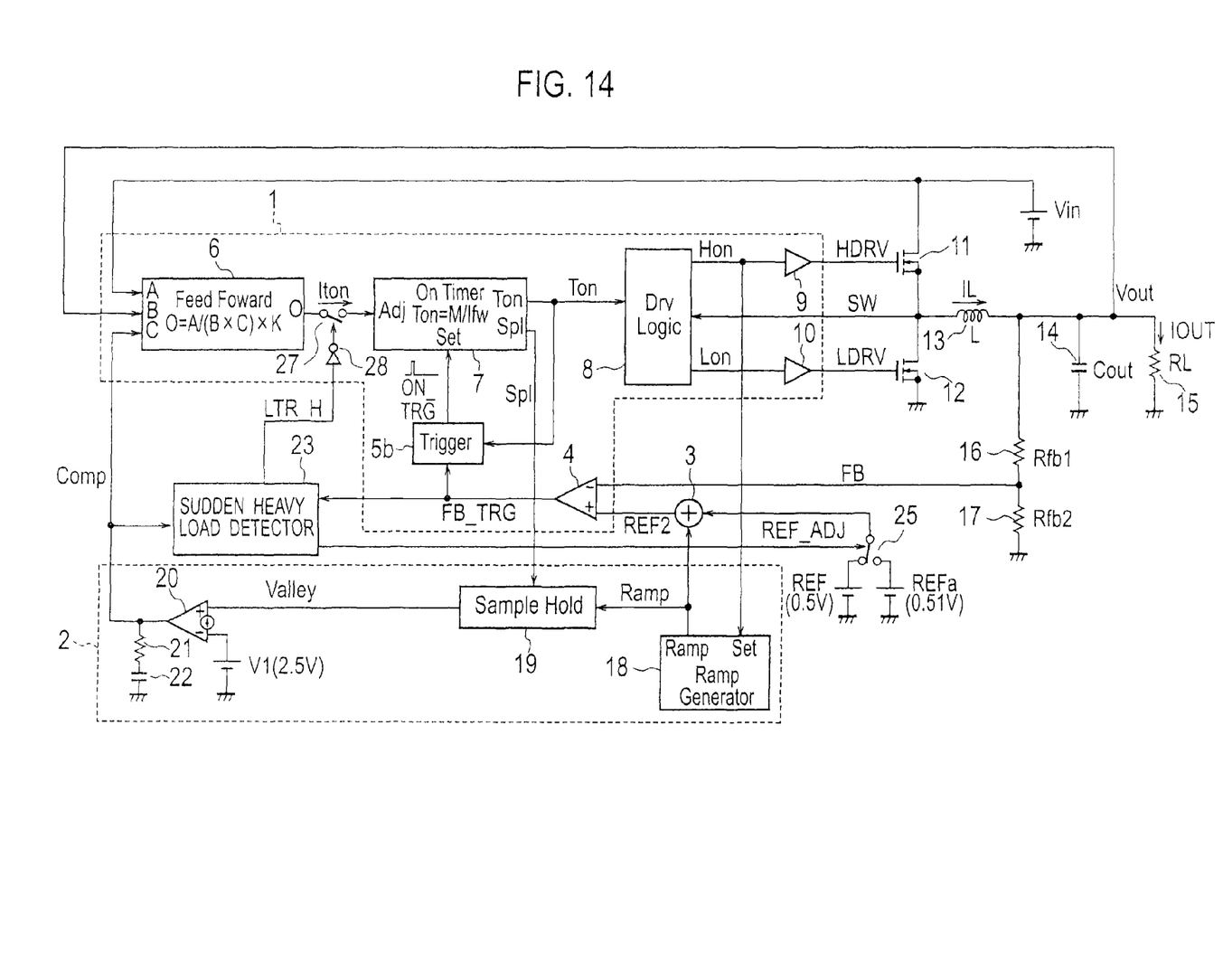
FIG. 14 is a circuit diagram illustrating a switching power source apparatus according to Embodiment 2 of the present invention.

FIG. 14 is a circuit diagram illustrating a switching power source apparatus according to Embodiment 2 of the present invention. Embodiment 2 differs from Embodiment 1 illustrated in FIG. 3 in that Embodiment 2 employs a switch 27 instead of the switch 24 of Embodiment 1. The other elements of Embodiment 2 are the same as those of Embodiment 1, and therefore, are represented with the same reference marks as those of Embodiment 1.

If light load changes to heavy load according to the present embodiment, the sudden heavy load detector 23 expands the ON width of the high-side MOSFET 11 by controlling operation of the first feedback controller 1. In more detail, the sudden heavy load detector 23 detects that light load has changed to heavy load, outputs a signal LTR_H of high level to turn off the switch 27 through an inverter 28.

Operation of the switching power source apparatus of the present embodiment will be explained. If the output load current Iout suddenly changes from light load to heavy load and if the signal FB_TRG continues high level for a period longer than the delay time determined by the resistor 239 and capacitor 240 (FIG. 10), the sudden heavy load detector 23 changes the sudden heavy load signal LTR_H from low to high, to turn off the switch 27 through the inverter 28.

As a result, the current output Iton from the feedforward circuit 6 is not transferred to the ON timer 7. Then, in the ON timer 7 (FIG. 9), the capacitor 71 is not charged and the comparator 72 keeps a high-level output. As a result, the ON timer 7 outputs the drive logic control signal Ton fixed at high level to maintain the ON period of the high-side MOSFET 11. The remaining operation is the same as that of Embodiment 1, and therefore, will not be explained.

In this way, the switching power source apparatus according to Embodiment 2 expands the ON period of the high-side MOSFET 11 if light load suddenly changes to heavy load, thereby providing effect similar to that provided by Embodiment 1.

In summary, the switching power source apparatus according to any embodiment of the present invention realizes stable operation even with an output capacitor having a small ESR and good load regulation characteristic.

The switching power source apparatus according to the present invention is applicable to electric equipment that needs a stable power supply.

This application claims benefit of priority under 35 USC §119 to Japanese Patent Application No. 2010-176047, filed on Aug. 5, 2010, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:
1. A switching power source apparatus comprising:
a high-side switch connected to an input voltage;

a ramp signal generator configured to generate a ramp signal in synchronization with a switching frequency of the high-side switch;

an amplitude signal generator configured to generate an amplitude signal corresponding to an amplitude of the ramp signal;

a superposing circuit configured to generate a second ramp signal having a positive inclination corresponding to the amplitude and frequency of the ramp signal and provide a superposed signal by superposing the second ramp signal on a first reference voltage;

a controller configured to compare the superposed signal with a feedback signal corresponding to an output voltage, and if the feedback signal is lower than the superposed signal, control the ON timing of the high-side switch so that the high-side switch turns on, the controller being also configured to control the ON width of the high-side switch according to the amplitude signal, input voltage, and output voltage; and a sudden heavy load detector configured to detect if light load changes to heavy load according to the superposed signal and feedback signal, and if detects such a change, widen the ON width of the high-side switch.

2. The switching power source apparatus of claim 1, wherein
if the change from light load to heavy load is detected, the sudden heavy load detector forcibly changes the amplitude signal in order to widen the ON width of the high-side switch.

3. The switching power source apparatus of claim 1, wherein
if the change from light load to heavy load is detected, the sudden heavy load detector controls the operation of the controller in order to widen the ON width of the high-side switch.

4. The switching power source apparatus of claim 1, further comprising
a reference voltage controller configured to control the magnitude of the first reference voltage according to a detection result of the sudden heavy load detector and the amplitude signal.

5. The switching power source apparatus of claim 1, wherein
the controller controls the ON width of the high-side switch according to the amplitude signal so that the amplitude of the ramp signal maintains a predetermined value.

6. The switching power source apparatus of claim 1, wherein
the controller, based on the amplitude signal, configured to widen the ON width of the high-side switch if the amplitude of the ramp signal is smaller than a predetermined value and to narrow the ON width if the amplitude of the ramp signal is equal to or greater than the predetermined value.

7. The switching power source apparatus of claim 1, wherein the amplitude signal generator includes:
a sample and hold circuit configured to hold a valley voltage of the ramp signal; and
an error amplifier configured to compare the valley voltage with a second reference voltage and generate, according to a result of the comparison, an error amplified signal as the amplitude signal.

8. The switching power source apparatus of claim 1, wherein
the sudden heavy load detector has a switch configured to fix the amplitude signal to a predetermined level regardless of the generated amplitude signal of the amplitude signal generator if the change from light load to heavy load is detected in order to forcibly widen the ON width of the high-side switch.

9. The switching power source apparatus of claim 8, wherein
the sudden heavy load detector controls the controller so that the ON width of the high-side switch is widen upon detecting a change in load from light to heavy.

10. The switching power source apparatus of claim 8, further comprising
a reference voltage controller configured to change the level of the first reference voltage according to a detection result of the sudden heavy load detector and the amplitude signal.

11. The switching power source apparatus of claim 8, wherein
the controller controls the ON width of the high-side switch according to the amplitude signal so that the amplitude of the ramp signal maintains a predetermined value.

12. The switching power source apparatus of claim 8, wherein
the controller, based on the amplitude signal, widens the ON width of the high-side switch if the amplitude of the ramp signal is smaller than a predetermined value and narrows the ON width if the amplitude of the ramp signal is equal to or greater than the predetermined value.

13. The switching power source apparatus of claim 8, wherein the amplitude signal generator includes:
a sample and hold circuit configured to hold a valley voltage of the ramp signal; and
an error amplifier configured to compare the valley voltage with a second reference voltage, generate an error amplified signal according to the result of the comparison, and output the error amplified signal as the amplitude signal.

* * * * *